United States Patent Office 2,730,125
Patented Jan. 10, 1956

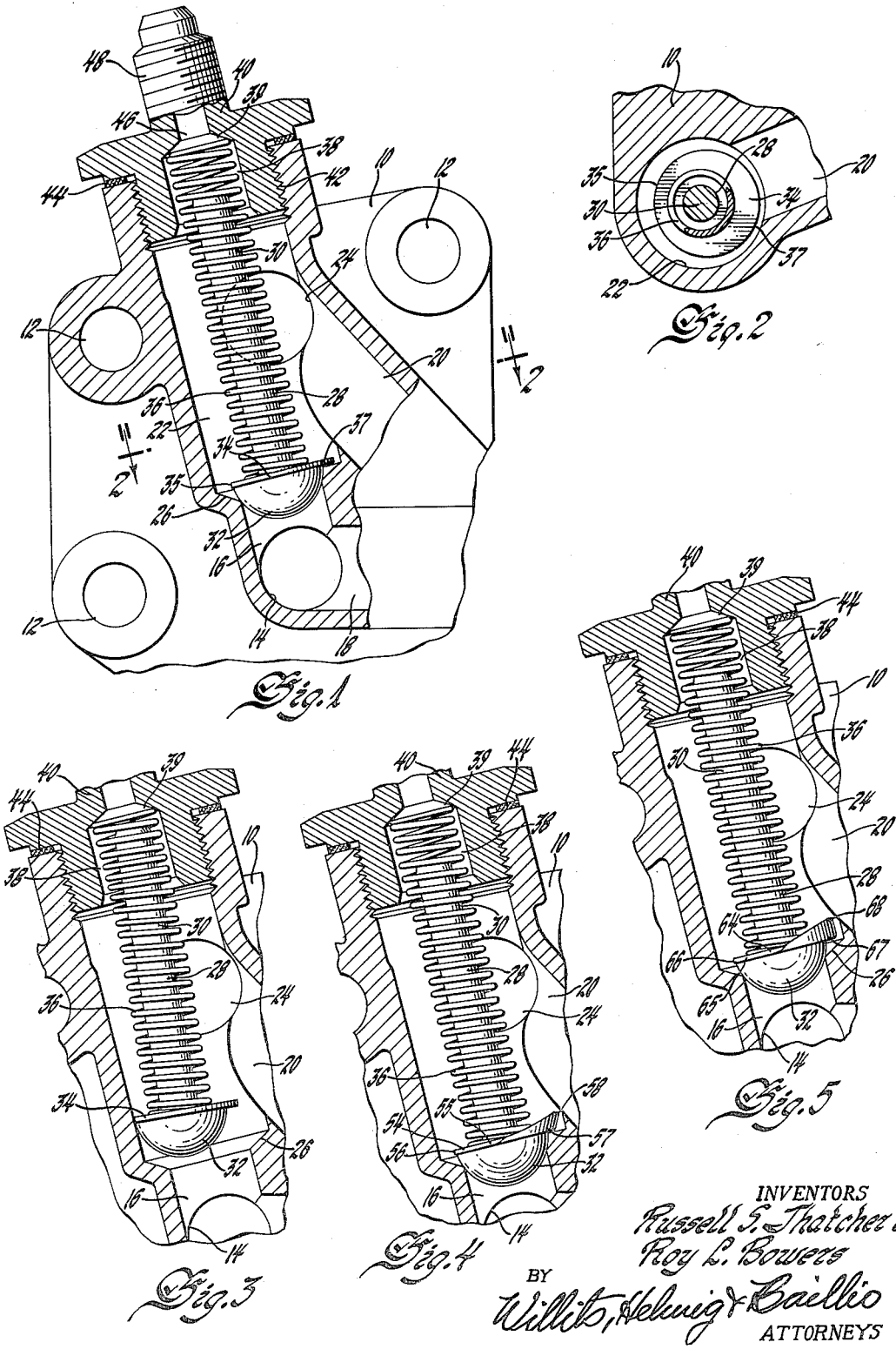
INVENTORS
Russell S. Thatcher &
Roy L. Bowers
BY
Willits, Helwig & Baillio
ATTORNEYS

2,730,125

FILTER VALVE WITH DEFLECTOR

Russell S. Thatcher and Roy L. Bowers, Flint, Mich., assignors to General Motors Corporation, Detroit, Mich., a corporation of Delaware Application April 16, 1952, Serial No. 282,662

8 Claims. (Cl. 137—543.21)

This invention relates to an oil filter by-pass valve and more particularly to an improved damped by-pass valve.

Under certain conditions of operation the normal balanced type of check valve which employs a ball or a headed stem as the moving part is subject to excessive vibration. This vibration creates an objectionable noise or chatter and results in excessive valve and valve seat wear. This type of vibration may be substantially eliminated by forming the moving parts of the valve, the valve spring and the valve head, to provide an unbalanced lateral force acting on the valve head and permitting the valve head to move laterally.

The primary object of the invention is to provide an improved check valve wherein unbalanced fluid forces act on the movable valve head to exert an unbalanced lateral force component which will dampen excessive vibration of the valve head.

Another object of the invention is to provide an improved check valve or by-pass valve wherein the area of the valve head in contact with the fluid when the valve is closed, is eccentrically related to the total area of the valve head to provide an unbalanced fluid force on the movable valve head to exert an unbalanced lateral force on the valve head to dampen chatter and vibration of the valve.

Another object of the invention is to provide a damped by-pass valve wherein the valve head has an eccentric washer positioned over the valve stem and located with the outer perimeter eccentric to the valve seat engaging portion of the valve head.

These and other objects of the invention will be apparent from the drawing and specification illustrating several preferred embodiments of the invention.

Figure 1 is a partial sectional view of a filter housing showing the by-pass valve.

Figure 2 is a partial sectional view of Figure 1 on the line 2—2.

Figure 3 is a partial sectional view showing the by-pass valve of Figure 1 in the opened position.

Figure 4 is a partial sectional view of an oil filter housing showing a modified by-pass valve.

Figure 5 is a partial sectional view of an oil filter housing showing another modified by-pass valve.

The improved non-chattering by-pass relief valve is illustrated in an automotive oil filter housing. It is particularly important in automotive applications to eliminate chatter or noise and the excessive wear caused by the chatter. A portion of an oil filter housing 10 including the by-pass valve and associated oil passages is illustrated in the drawing.

The automotive oil filter housing 10 has apertures 12 for the screws which secure the housing to a boss on the engine block (not shown). The oil from the engine oil pump enters the inlet passage 14 at the back of the filter housing. The oil normally flows past the by-pass valve passage 10 and to the right through the filter inlet passage 18 to the oil filter chamber (not shown). The filtered oil returns from the filter chamber through the filter outlet passage 20 to the by-pass valve chamber 22. The filter oil leaves the valve chamber 22 through an outlet passage 24 extending from the back of the valve chamber to the back of the filter housing 10 where it connects with the engine lubricating system in the engine block.

The by-pass passage consisting of the by-pass valve passage 16 and the valve chamber 22 connects the inlet passage 14 and the outlet passage 24. Both the valve passage 16 and the valve chamber 22 are circular in cross section and coaxially arranged as illustrated in Figure 2 and are connected by a beveled valve seat 26 which is of substantially uniform width or substantially symmetrical. A by-pass valve 28, having a cylindrical stem 30 and a semi-spherical head 32 coaxially arranged, seats on the valve seat 26 with the spherical portion of head 32 engaging the valve seat edge with the valve passage 16 to close the by-pass passage. In order to provide a transverse force on the valve 28, an eccentric washer 34 is placed on the valve stem 30 against the flat back surface of the valve head 32. The eccentric washer 34 has a circular outer edge and round hole fitting over the valve stem. The round hole is eccentrically located with respect to the circular outer edge of the washer to position the washer eccentrically with respect to the semi-spherical valve head 32. As illustrated in Figure 1 the point 35 at one side of the washer is substantially in alignment with the edge of the valve head 32 or has a very small overhang while the point 37 at the opposite side has a substantial overhang. As illustrated in Figure 2 the intermediate portions have a balanced tapering overhang between the portion having the smallest or no overhang and the portion having the largest overhang.

The valve 28 is normally maintained with the head 32 engaging the valve seat 16 by a helical coil spring 36 which fits over the valve stem 30 and engages the washer 34 to hold the washer in position on the back surface of the semi-spherical valve head 32 to hold the valve head 32 on seat 16. The spring 36 extends beyond the valve stem 30 and loosely fits into a counterbore 38 and abuts the shoulder 39 of a spring abutment 40 which is secured within the outer end of the valve chamber 22 by suitable means such as threads 42. Sealing means such as gasket 44 may also be provided. If desired, the spring abutment may have a suitable aperture 46 and fitting 48 for a pipe to the oil pressure gauge.

A modified eccentric washer 54 which may be used with the valve described in Figure 1 is illustrated in Figure 4. The eccentric washer 54 has a base portion 55 having substantially the same shape as the eccentric washer 34 illustrated in Figure 1. The base portion 55 has substantially no overhang or minimum overhang at a point 56 on one side and the overhang gradually increases symmetrically on both sides from point 56 to a point 57 of maximum overhang diametrically opposite the point 56. On the side of the washer symmetrically located about point 57 and having the maximum overhang a semi-circular bevel flange 58 extends upwardly and outwardly from the base portion 55. The bevel flange 58 has a maximum height at the point 57 of maximum overhang and symmetrically tapers downwardly on both sides of the washer and terminates on both sides of the washer at the sides intermediate or half-way between the point 56 of substantially no overhang and the point 57 of maximum overhang.

Another modified form of eccentric washer 64 is shown in Figure 5. The other valve parts are the same as shown in Figure 1 and need not be described again. The washer 64 has a flat eccentric base portion 65 similar to flat eccentric washer 34. The base portion is circular and has a circular hole located eccentrically in the washer and fitting over the valve stem 30. When the washer 64 is located on the valve member 28 the point 66 on one side of the washer is substantially in alignment with the edge of valve head 32 and the point 67 on the diametrically opposite side has the maximum overhang beyond the edge of the valve head. The overhang gradually tapers on both sides of the washer from the point 67 of maximum overhang to the point 66 of minimum or no overhang. At the point 67 of maximum overhang, a lip 68 extends away from the valve head 32 and is perpendicular to the base portion 65 of the washer 64. The lip 68 has its greatest height at point 67 and gradually diminishes in height as the lip extends around both sides of the washer. On each side the lip 68 terminates at or near the midpoint between the point 66 of no overhang and the point 67 of maximum overhang.

Though it is believed that the operation of this valve will be apparent from the above description of the structure, the preferred mode of operation will be outlined. The unfiltered fluid enters from the back of housing 10 and flows into inlet passage 14 and past the valve passage 16 and to the right through filter inlet passage 18 to the filter. The filtered fluid leaves the filter through filter outlet passage 20 and flows through the chamber 22 and out through the outlet passage 24 to the back of the housing 10. If the pressure in the inlet passages 14 and 18 is excessive, the by-pass valve 28 opens permitting the fluid to flow through the valve passage 16, the chamber 22 and the outlet passage 24. When the valve 28 rises from the seat 26, it compresses the spring 36. It will be noted that the valve stem 30 is unguided or fits loosely within the spring and the spring fits loosely in the counterbore 38 of spring abutment 40 to permit lateral movement of the valve. The fluid flowing past the side of the valve head 32 having the maximum overhang of the eccentric washer 34 encounters the greatest resistance in flowing through the valve. This resistance reduces the velocity of the fluid on the side about the point 37 of maximum overhang and thus the fluid exerts a greater transverse pressure on this side of the valve than on the other side of the valve. Therefore as the valve moves upwardly, the fluid pressure exerts a transverse force on the valve and moves the valve transversely in a direction opposite to the overhang of the eccentric washer. The bevel lip 58 and the perpendicular lip 68 of the eccentric washers 54 and 64 provide additional transverse force to provide additional damping action to improve the operation of the valve. These modified forms of the invention are particularly important where damping is required where lower fluid temperatures and resultant higher viscosities are encountered or where the valve bore structures prevents the use of sufficient overhang to provide the required lateral force to damp the vibration.

We claim:

1. In a relief valve, a valve body, a passage having an internal wall in said valve body, a valve seat of substantially constant width in said passage, a valve head positioned within said passage and cooperating with said valve seat when the valve is closed, said valve head being mounted for axial and transverse movement, a spring resiliently urging said valve head against said valve seat to close said passage, and cooperating means including an eccentric washer on said valve head to restrict the said passage at one side to provide an unbalanced lateral fluid force on the valve head to move the valve head laterally to dampen vibration.

2. In a relief valve, a valve body having a passage, a substantially symmetrical valve seat in said passage, a valve head positioned within said passage and cooperating with said valve seat, said valve head being mounted for axial and transverse movement, a spring resiliently urging said valve head against said valve seat to close said passage, and said valve head having an eccentric portion arranged at the fluid discharge side of said seat to reduce the flow on one side of said passage to exert a transverse force on the valve to damp vibration.

3. In a relief valve, a valve body having a passage, a substantially symmetrical valve seat in said passage, a valve head positioned within said passage and cooperating with said valve seat, said valve head having a stem and being mounted for axial and transverse movement, an abutment in said passage, a spring mounted in said passage having its opposite ends engaging said abutment and said valve head resiliently to urge said valve head against said valve seat to close said passage, and said valve head having an eccentric portion surrounding said stem to reduce the flow on one side to exert a transverse force on the valve to damp vibration.

4. In a relief valve, a valve body having a passage, a valve seat in said passage, a valve head positioned within said passage and cooperating with said valve seat, said valve head being mounted for axial and transverse movement, a spring resiliently urging said valve head against said valve seat to close said passage, a member positioned on said valve head and having a portion eccentrically overhanging the outlet end of said valve head to reduce the flow on one side to exert a transverse force on the valve to damp vibration, and said spring engaging said member to hold it in position on said valve member.

5. In a relief valve, a valve body having a passage, a valve seat in said passage, a valve member having a head concentrically positioned within said passage and cooperatively engaging said valve seat to close said passage, said valve member having a stem connected to said head portion, an eccentric washer positioned on said stem and having one face engaging said valve head and having one side overhang the edge of the valve head, said valve body having a spring abutment, and a spring positioned around said stem and engaging said spring abutment and the other face of said eccentric washer to hold said eccentric washer in position on said valve head and to resiliently urge the valve head on said valve seat.

6. In a relief valve, a valve body having a passage, a valve seat in said passage, a valve member having a head and a stem connected to said head positioned within said passage for movement between an opened and a closed position with the head engaging said valve seat to close said passage, said valve member being mounted for free lateral movement in said opened position, an eccentric washer positioned on said stem and having one face engaging said valve head and having one side overhang the edge of the valve head, said valve body having a spring abutment, and a spring positioned around said stem and engaging said spring abutment and the other face of said eccentric washer to hold said eccentric washer in position on said valve head and to resiliently urge the valve member toward closed position with the valve head on said valve seat.

7. In a relief valve, a valve body having a passage, a valve seat in said passage, a valve head positioned within said passage and cooperating with said valve seat, said valve head being mounted for axial and transverse movement, a spring resiliently urging said valve head against said valve seat to close said passage, a member positioned on the outlet end of said valve head and having a portion eccentrically overlapping said valve head to reduce the flow on one side of the passage, and said member having a flat base and a semi-circular bevel flange on the said overlapping portion.

8. In a relief valve, a valve body having a passage, a valve seat in said passage, a valve head positioned within said passage to cooperate with said valve seat for closing said passage, said valve head being mounted for axial and transverse movement, a member with a flat base portion eccentrically overlapping the outlet end of said valve head to reduce the flow on one side of the passage, and said flat base portion having a lip extending perpendicular thereto.

References Cited in the file of this patent

UNITED STATES PATENTS

| | | |
|---|---|---|
| 1,226,796 | Newcombe | May 22, 1917 |
| 1,716,722 | Fausek | June 11, 1929 |
| 1,807,594 | Hopkins | June 2, 1931 |
| 1,896,706 | Grimes | Feb. 7, 1933 |
| 2,510,489 | Winchester | June 6, 1950 |
| 2,603,452 | Spinney | July 15, 1952 |